United States Patent
Sezai et al.

(10) Patent No.: US 6,905,629 B2
(45) Date of Patent: Jun. 14, 2005

(54) MN-ZN FERRITE, TRANSFORMER MAGNETIC CORE AND TRANSFORMER

(75) Inventors: Yuji Sezai, Tokyo (JP); Katsushi Yasuhara, Tokyo (JP); Kenya Takagawa, Tokyo (JP); Masahiko Watanabe, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/650,733

(22) Filed: Aug. 29, 2003

(65) Prior Publication Data

US 2004/0090302 A1 May 13, 2004

(30) Foreign Application Priority Data

Sep. 2, 2002 (JP) ......................................... 2002-257015
Mar. 13, 2003 (JP) ......................................... 2003-067949

(51) Int. Cl.[7] ................................................. H01F 1/34
(52) U.S. Cl. ................................. 252/62.62; 252/62.59; 252/62.63; 336/233; 336/221
(58) Field of Search ................................. 336/233, 221; 252/62.62, 62.59, 62.63

(56) References Cited

U.S. PATENT DOCUMENTS 5,846,448 A * 12/1998 Yasuhara et al. ......... 252/62.56
6,077,453 A * 6/2000 Saita et al. ............... 252/62.59

FOREIGN PATENT DOCUMENTS

| JP | B2 61-11892 | 4/1986 | |
| JP | B2 61-43291 | 9/1986 | |
| JP | B2 4-33755 | 6/1992 | |
| JP | B2 5-21859 | 3/1993 | |
| JP | A 6-290925 | 10/1994 | |
| JP | A 6-310320 | 11/1994 | |
| JP | A 8-191011 | 7/1996 | |
| JP | A 9-2866 | 1/1997 | |
| JP | A 9-134815 | 5/1997 | |
| JP | A 2001-80952 | 3/2001 | |
| JP | 2001-80952 | * 3/2001 | |
| JP | A 2001-220146 | 8/2001 | |
| JP | A 2002-231520 | 8/2002 | |
| JP | 2002-231520 | * 8/2002 | |

* cited by examiner

Primary Examiner—C. Melissa Koslow
(74) Attorney, Agent, or Firm—Oliff & Berridge, PLC

(57) ABSTRACT

An Mn—Zn ferrite wherein 0 to 5000 ppm of a Co oxide in a $Co_3O_4$ conversion is contained in a basic component constituted by $Fe_2O_3$: 51.5 to 57.0 mol % and ZnO: 0 to 15 mol % (note that 0 is not included) wherein the rest is substantially constituted by MnO; and a value $\alpha$ in a formula (1) below in said ferrite satisfies $\alpha \geq 0.93$.

$$\alpha = ((Fe^{2+} - Mn^{3+} - Co^{3+}) \times (4.29 \times A + 1.91 \times B + 2.19 \times C + 2.01 \times D))/((A - B - C - D) \times 100) \quad \text{formula (1)}.$$

Note that in the formula (1), $(Fe^{2+} - Mn^{3+} - Co^{3+})$: [wt %], A: $Fe_2O_3$ [mol %], B: MnO [mol %], C: ZnO [mol %] and D: CoO [mol %]. According to the present invention, a highly reliable Mn—Zn ferrite used as a magnetic core of a power supply transformer, etc. of a switching power supply, etc., having a small core loss in a wide temperature range, furthermore, exhibiting a little deterioration of core loss characteristics under a high temperature (in a high temperature storage test) and having excellent magnetic stability, a transformer magnetic core and a transformer can be provided.

15 Claims, No Drawings

MN-ZN FERRITE, TRANSFORMER MAGNETIC CORE AND TRANSFORMER

BACKGROUND OF THE INVENTION

1. Field of the Invention

The present invention relates to an Mn—Zn ferrite, a transformer magnetic core and a transformer, and particularly relates to an Mn—Zn ferrite used as a magnetic core of a power supply transformer, etc. of a switching power supply, etc., having a small power loss (core loss) particularly in a wide temperature range, exhibiting a little deterioration of core loss characteristics also under a furthermore higher temperature (in a high temperature storage test), and having an excellent magnetic stability, a transformer magnetic core and a transformer.

2. Description of the Related Art

In recent years, there have been increasing demands on a variety of electronic devices to be more compact, thinner and more advanced. A more compact and thinner power supply transformer, etc. has been also demanded in a switching power supply, etc. To obtain a more compact and thinner transformer, a reduction of a core loss of a magnetic core becomes essential. Furthermore, when considering an operation environment of a power supply, etc., a highly reliable magnetic core having a small core loss in a wide temperature range, furthermore, exhibiting a little deterioration of core loss characteristics under a high temperature (in a high temperature storage test) to prevent thermal burn-up of an electronic circuit, and having excellent magnetic stability is demanded.

Under such demands, proposals have been made to reduce a core loss in a wide temperature range by dissolving a suitable amount of Co in an Mn—Zn ferrite (refer to the Patent Articles 1 to 13).

Patent Article 1 the Japanese Unexamined Patent Publication No. 6-290925

Patent Article 2 the Japanese Unexamined Patent Publication No. 6-310320

Patent Article 3 the Japanese Unexamined Patent Publication No. 8-191011

Patent Article 4 the Japanese Unexamined Patent Publication No. 9-2866

Patent Article 5 the Japanese Unexamined Patent Publication No. 9-134815

Patent Article 6 the Japanese Unexamined Patent Publication No. 13-80952

Patent Article 7 the Japanese Unexamined Patent Publication No. 13-220146

Patent Article 8 the Japanese Unexamined Patent Publication No. 2002-231520

Patent Article 9 the Japanese Examined Patent Publication No. 61-11892

Patent Article 10 the Japanese Examined Patent Publication No. 61-43291

Patent Article 11 the Japanese Examined Patent Publication No. 4-33755

Patent Article 12 the Japanese Examined Patent Publication No. 5-21859

Patent Article 13 the Japanese Examined Patent Publication No. 8-1844

Here, the reason why a core loss can be made small in a wide temperature range by dissolving Co will be explained.

A magneto crystalline anisotropy constant K1 is a factor of dominating a core loss, temperature characteristics of a core loss change with a temperature change of K1, and the core loss becomes a minimum value at a temperature under which K1=0 stands. To reduce the core loss in a wide temperature range, K1 has to be made close to 0 in a wide temperature range. This constant K1 differs depending on a constituting element of a spinel compound as a main phase of a ferrite, but in the case of an Mn—Zn ferrite, it is considered that temperature dependency of K1 is made less by dissolving Co ions, and an absolute value of a magnetic loss temperature constant can be made small.

As described in the above publications, proposals have been made to reduce a core loss in a wide temperature range by dissolving a suitable amount of Co in an Mn—Zn ferrite.

However, there is no description on a means to enhance stability and reliability of core loss characteristics under a high temperature (in a high temperature storage test) further to prevent thermal burn-up of an electronic circuit in consideration on an operation environment of a power supply, etc.

SUMMARY OF THE INVENTION

An object of the present invention is to solve the above disadvantages and to provide a highly reliable Mn—Zn ferrite used as a magnetic core of a power supply transformer, etc. of a switching power supply, etc., having a small core loss in a wide temperature range, furthermore, exhibiting a little deterioration of core loss characteristics under a high temperature (in a high temperature storage test) and having excellent magnetic stability, a transformer magnetic core and a transformer.

The present inventors focused on cations in an Mn—Zn ferrite containing Co, found that stability and reliability of core loss characteristics can be enhanced under a high temperature (in a high temperature storage test) by setting a value a in the formula (1) below in the ferrite to be a predetermined value, and completed the present invention.

Namely, according to a first aspect of the present invention, there is provided an Mn—Zn ferrite wherein 0 to 5000 ppm of a Co oxide in a $Co_3O_4$ conversion is contained in a basic component constituted by $Fe_2O_3$: 51.5 to 57.0 mol % and ZnO: 0 to 15 mol % (note that 0 is not included) wherein the rest is substantially constituted by MnO; wherein a value $\alpha$ in a formula (1) below in said ferrite satisfies $\alpha \geq 0.93$.

$$\alpha = ((Fe^{2+}-Mn^{3+}-Co^{3+}) \times (4.29 \times A + 1.91 \times B + 2.19 \times C + 2.01 \times D))/((A-B-C-D) \times 100) \quad \text{formula (1)}$$

Note that in the formula (1), $(Fe^{2+}-Mn^{3+}-Co^{3+})$: [wt %], A: $Fe_2O_3$ [mol %], B: MnO [mol %], C: ZnO [mol %] and D: CoO [mol %].

According to a second aspect of the present invention, there is provided an Mn—Zn ferrite wherein 0 to 5000 ppm of a Co oxide in a $Co_3O_4$ conversion is contained in a basic component constituted by $Fe_2O_3$: 51.5 to 57.0 mol % and ZnO: 0 to 15 mol % (note that 0 is not included) wherein the rest is substantially constituted by MnO; and By using, for example, a BH analyzer, a sinusoidal alternating magnetic field of 100 kHz and 200 mT is applied to said ferrite, and when assuming that values of a core loss measured respectively at 75° C. and 120° C. are Pcv1, and values of a core loss measured under the same condition as that in the measurement of Pcv1 after stored at a high temperature (96 hours in an atmosphere of 175° C.) are Pcv2, a core loss deterioration rate shown in a formula (2) is 3% or less at 75° C. and 5% or less at 120° C.

$$\text{Core Loss Deterioration Rate } (\%) = ((Pcv1-Pcv2)/Pcv1) \times 100 \quad \text{formula (2)}$$

According to a third aspect of the present invention, there is provided an Mn—Zn ferrite wherein 0 to 5000 ppm of a Co oxide in a $Co_3O_4$ conversion is contained in a basic component constituted by $Fe_2O_3$: 51.5 to 57.0 mol % and ZnO: 0 to 15 mol % (note that 0 is not included) wherein the rest is substantially constituted by MnO; and By using, for example, a BH analyzer, a sinusoidal alternating magnetic field of 100 kHz and 200 mT is applied to said ferrite, and when assuming values of a core loss measured respectively at 75° C. and 120° C. are Pcv1, and values of a core loss measured under the same condition as that in the measurement of Pcv1 after stored at a high temperature (96 hours in an atmosphere of 200° C.) are Pcv3, a core loss deterioration rate shown in a formula (3) is 27% or less at 75° C. and 30% or less at 120° C.

$$\text{Core Loss Deterioration Rate } (\%) = ((Pcv1-Pcv3)/Pcv1) \times 100 \quad \text{formula (3)}$$

When the value α in the formula (1) in the ferrite is 0.93 or more, deterioration of core loss characteristics after the high temperature test (96 hours under 175° C.) can be significantly suppressed.

Specifically, by using a BH analyzer, a sinusoidal alternating magnetic field of 100 kHz and 200 mT is applied to the above ferrite, and when assuming that values of the core loss measured at 75° C. and 120° C. are Pcv1, and a values of the core loss measured respectively under the same condition as that in the measurement of Pcv1 after storing the ferrite at a high temperature (96 hours under 175° C.) after the measurement of the Pcv1 are Pcv2, a core loss deterioration rate expressed by the formula (2) below can be 3% or less at 75° C., or 5% or less at 120° C.

$$\text{Core Loss Deterioration Rate } (\%) = ((Pcv1-Pcv2)/Pcv1) \times 100 \quad \text{formula (2)}$$

Also, by using a BH analyzer, a sinusoidal alternating magnetic field of 100 kHz and 200 mT is applied to the above ferrite, and when assuming that values of the core loss measured respectively at 75° C. and 120° C. are Pcv1, and values of the core loss respectively measured under the same condition as that in the measurement of the Pcv1 after storing the ferrite at a high temperature (96 hours under 200° C.) after the measurement of the Pcv1 are Pcv3, the core loss deterioration rate expressed by the formula (3) below can be 27% or less at 75° C., or 30% or less at 120° C.

$$\text{Core Loss Deterioration Rate } (\%) = ((Pcv1-Pcv3)/Pcv1) \times 100 \quad \text{formula (3)}$$

While the reason why deterioration of the core loss can be suppressed as above is not exactly clear, it is proved by experiments by the present inventors, etc. and presumed as below.

As a cause of deterioration of the core loss by being stored under a high temperature, an increase of magnetic anisotropy due to movement of Co ions by cation defect is presumed. However, in the case of an Mn—Zn ferrite wherein Co is dissolved, it is difficult to accurately and separately weigh respective amounts of $Fe^{2+}$, $Fe^{3+}$, $Co^{3+}$ and $Co^{3+}$. Therefore, it is difficult to directly weigh an amount of cation defect (nonstoichiometric oxygen amount). Thus, in the present invention, a parameter, that is the value a in the formula (1) able to be weighed by a current measurement device, was devised, and it was found that deterioration of the core loss after the high temperature test can be suppressed by controlling the value, so that the present invention was completed.

According to the present invention, by using the ferrite according to the present invention as a transformer magnetic core used in a power supply transformer, etc. of a switching power supply, etc. or as a transformer (one obtained by winding a coil around a magnetic core), the core loss is reduced in a wide temperature range of 25 to 120° C. Also, the deterioration rate of the core loss after the high temperature storage test (96 hours under 175° C.) is also lowered, and a highly reliable magnetic core and a transformer having excellent magnetic stability can be obtained. Therefore, a switching power supply and a power supply transformer capable of attaining a reduced loss, a compact body, prevention of thermal burn-up and enhancement of reliability, etc. can be obtained Next, the reason of limiting ranges of values in the present invention will be explained.

When a composition of $Fe_2O_3$ becomes smaller than 51.5 mol % or when a composition of ZnO becomes larger than 15 mol %, a core loss at an initial stage before a high temperature storage test becomes large and a reduced core loss is hard to be obtained in a desired wide temperature range of 25 to 120° C. When a composition of $Fe_2O_3$ becomes larger than 57.0 mol %, the core loss at an initial stage before the high temperature storage test becomes large and a reduced core loss becomes hard to be obtained in a desired wide temperature range of 25 to 120° C. Also, when a composition of ZnO is 0 mol %, deterioration of a relative density of a sintered body arises and a core loss at an initial stage before the high temperature storage test becomes large, so that a reduced core loss is hard to be obtained in a desired wide temperature range of 25 to 120° C.

Also, when a content of a Co oxide in a $Co_3O_4$ conversion becomes 0 ppm, a core loss at an initial stage before the high temperature storage test is large and a reduced core loss becomes hard to be obtained in a desired wide temperature range of 25 to 120° C. Also, when a content of a Co oxide in a $Co_3O_4$ conversion becomes more than 5000 ppm, a core loss at an initial stage before the high temperature storage test is large particularly on the high temperature side and a reduced core loss is hard to be obtained in a desired wide temperature range of 25 to 120° C.

The ferrite according to the present invention preferably contains $SiO_2$: 50 to 220 ppm and CaO: 120 to 1400 ppm as other subcomponents. It is to improve sinterability and to form a high resistance layer on crystal grain boundaries.

When a content of $SiO_2$ becomes smaller than 50 ppm or a content of CaO becomes smaller than 120 ppm, sintering is hard to be accelerated and a sufficient high resistance layer is hard to be formed on crystal grain boundaries, so that there is a tendency that the core loss at an initial stage before the high temperature storage test and the core loss after the high temperature storage test become much compared with those having the same composition except for the content of $SiO_2$ or CaO.

Also, when a content of $SiO_2$ becomes larger than 220 ppm or a content of CaO becomes larger than 1400 ppm, abnormal growth of crystal is liable to occur and a grain boundary layer is also liable to be excessively formed, so that there is a tendency that the core loss at an initial stage before the high temperature storage test and the core loss after the high temperature storage test become much compared with those having the same composition except for the content of $SiO_2$ or CaO.

The ferrite according to the present invention preferably contains as still other subcomponents at least one kind from $Nb_2O_5$: 0 to 500 ppm (note that 0 is not included), $ZrO_2$: 0 to 500 ppm (note that 0 is not included), $Ta_2O_5$: 0 to 1000 ppm (note that 0 is not included), $V_2O_5$: 0 to 500 ppm (note that 0 is not included), and $HfO_2$: 0 to 500 ppm (note that 0 is not included).

As a result that these subcomponents are contained, a high resistance layer is formed on crystal grain boundaries of the ferrite, and particularly an eddy current loss in the core loss (mainly a hysteresis loss and an eddy current loss) can be reduced. Therefore, as a result that these subcomponents are contained, the core loss at an initial stage before the high temperature storage test can be reduced, a reduced core loss in a desired wide temperature range of 25 to 120° C. is easily obtained, and deterioration of core loss characteristics after the high temperature storage test can be made further less compared with those having the same composition except for not containing these subcomponents.

When a content of $Nb_2O_5$, $ZrO_2$, $V_2O_5$ and $HfO_2$ becomes larger than 500 ppm, or when a content of $Ta_2O_5$ becomes larger than 1000 ppm, grain boundary layer is liable to be excessively formed and effects of the present invention tends to become small.

The ferrite according to the present invention may contain phosphorus (P) and boron (B). A content of P and B in the ferrite is preferably P≦35 ppm or B≦35 ppm. The less the content of P and B in the ferrite, the better.

When a content of P becomes larger than 35 ppm, or a content of B becomes larger than 35 ppm, abnormal growth of crystal is liable to arise and effects of the present invention tends to become small.

In the present invention, a value α in the formula (1) in the above ferrite is preferably α≧0.94, more preferably α≧0.95, and the upper limit is not particularly limited but preferably 1.50 or less, more preferably 1.40 or less, further preferably 1.20 or less. When the value becomes larger than that, production tends to become extremely difficult.

By setting the value a in the formula (1) in the ferrite to satisfy α≧0.94, the core loss deterioration rate after the high temperature storage test can be made furthermore smaller. Also, by setting α≧0.95, the core loss deterioration rate after the high temperature storage test can be made furthermore smaller.

In the present invention, the value α in the formula (1) is obtained as below. The value α in the formula (1) can be calculated by composition analysis and determinate quantities of an amount of ($Fe^{2+}-Co^{3+}$) and an amount of $Mn^{3+}$. Namely, in the composition analysis, an Mn—Zn ferrite sintered body is pulverized to powder, then amounts of $Fe_2O_3$, MnO, ZnO and CoO can be measured by using a fluorescent X-ray analyzer (for example, Simultic 3530 made by Rigaku Corporation).

An amount of ($Fe^{2+}-Co^{3+}$) and an amount of $Mn^{3+}$ are quantitatively determined by pulverizing a sintered body of the Mn—Zn ferrite to powder, dissolving it in acid, and performing potential difference titration by using a $K_2Cr_2O_7$ solution. As to an amount of ($Fe^{2+}-Co^{3+}$), since $Fe^{2+}$ reacts with $Co^{3+}$, it is difficult to quantitatively determine respective accurate amounts of $Fe^{2+}$ $Fe^{3+}$, $Co^{2+}$ and $Co^{3+}$ separately in the case of the Mn—Zn ferrite wherein Co is dissolved, so that it is quantitatively determined as an amount of ($Fe^{2+}-Co^{3+}$).

The Mn—Zn ferrite according to the present invention is preferably produced, for example, as described below.

Namely, according to the present invention, there is provided a method of producing an Mn—Zn ferrite, wherein 0 to 5000 ppm of a Co oxide in a $Co_3O_4$ conversion is contained in a basic component constituted by $Fe_2O_3$: 51.5 to 57.0 mol % and ZnO: 0 to 15 mol % (note that 0 is not included) wherein the rest is substantially constituted by MnO, including:

a material preparation step for preparing materials so as to be in the above composition range;

a formation step for adding a binder to said materials and forming to be a predetermined shape to form a preform; and a firing step for firing said preform;

wherein said firing step includes a high temperature holding step; and a holding temperature in the high temperature holding step is 1250° C. to 1400° C., and when an oxygen partial pressure of a firing atmosphere is $PO_2$ (%) and the holding temperature is T(K), firing is performed under a $PO_2$ satisfying a formula (4) below.

$$Log(PO_2)=a-13000/T \qquad \text{formula (4)}$$

Note that "a" in the formula (4) satisfies 6.95≦a≦8.85.

For example, when the holding temperature is at 1300° C., the oxygen partial pressure of the sintering atmosphere is 0.05% to 3.80%.

The sintering step preferably includes a temperature raising step, a high temperature holding step and a temperature lowering step. In the temperature raising step, the oxygen partial pressure in the firing atmosphere is preferably 3.0% or less. In the high temperature holding step, the holding temperature is 1250 to 1400° C., and, for example, it is preferable that the oxygen partial pressure is 0.05% to 3.80% at 1300° C. The oxygen partial pressure is preferably set a little lower than in the related art. Note that when the oxygen partial pressure is lower than 0.05%, a core loss at an initial stage before a high temperature storage test tends to deteriorate. It is preferable that the higher the holding temperature at firing, the higher the oxygen partial pressure is set. Also, there is a tendency that the lower the oxygen partial pressure, the larger the value a in the formula (1) becomes and the less deterioration of the core loss after the high temperature storage test becomes.

Also, in the temperature lowering step, it is preferable to switch to a nitrogen atmosphere at 900° C. to 1200° C. The cooling rate after switching to the nitrogen atmosphere is preferably twice to ten times as fast as the cooling rate before the switching.

By selecting the production conditions as above, the Mn—Zn ferrite according to the present invention can be produced easily.

Effect of the Invention

According to the present invention, it is possible to provide a highly reliable Mn—Zn ferrite used as a magnetic core of a power supply transformer, etc. of a switching power supply, etc., having a small core loss in a wide temperature range, furthermore, exhibiting a little deterioration of core loss characteristics under a high temperature (in a high temperature storage test) and having excellent magnetic stability, a transformer magnetic core and a transformer.

DESCRIPTION OF THE PREFERRED EMBODIMENT

Below, the present invention will be explained based on embodiments.

According to an embodiment of the present invention, there is provided an Mn—Zn ferrite wherein 0 to 5000 ppm of a Co oxide in a $Co_3O_4$ conversion is contained in a basic component constituted by $Fe_2O_3$: 51.5 to 57.0 mol % and ZnO: 0 to 15 mol % (note that 0 is not included) wherein the rest is substantially constituted by MnO;

containing $SiO_2$: 50 to 220 ppm and CaO: 120 to 1400 ppm as other subcomponents;

containing at least one kind among $Nb_2O_5$: 0 to 500 ppm (note that 0 is not included), $ZrO_2$: 0 to 500 ppm (note that 0 is not included), $Ta_2O_5$: 0 to 1000 ppm (note that 0 is not included), $V_2O_5$: 0 to 500 ppm (note that 0 is not included), and $HfO_2$: 0 to 500 ppm (note that 0 is not included) as further other subcomponents; and a value α in a formula (1) below in said ferrite satisfies α≧0.93.

$$\alpha=((Fe^{2+}-Mn^{3+}-Co^{3+})\times(4.29\times A+1.91\times B+2.19\times C+2.01\times D))/((A-B-C-D)\times 100) \quad \text{formula (1)}$$

Note that in the formula (1), $(Fe^{2+}-Mn^{3+}-Co^{3+})$: [wt %], A: $Fe_2O_3$ [mol %], B: MnO [mol %], C: ZnO [mol %] and D: CoO [mol %].

The ferrite of the present invention may contain phosphorus (P) and boron (B), and a content of P and B in the ferrite is preferably P≦35 ppm or B≦35 ppm.

To produce an Mn—Zn ferrite according to an embodiment of the present invention, starting materials of a main component and subcomponents are prepared first. As starting materials of the main component, $Fe_2O_3$, $Mn_3O_4$, ZnO or materials which become oxides of these after firing are used. Also, as the starting materials of the subcomponents, $Co_3O_4$, $SiO_2$, CaO, $Nb_2O_5$, $ZrO_2$, $Ta_2O_5$, $V_2O_5$, $HfO_2$ or materials which become oxides of these after firing are used. These starting materials are weighed so that composition ranges after firing become the above ranges. Also, P and B may be contained in the starting materials, but they are adjusted to be in the above range in the final composition after firing.

First, starting materials of the main component are weighed so as to be in the above composition ranges, wet mixed and dried, then subjected to calcining at about 900° C. for two hours in the air. Thus obtained powder after the calcining is added with weighed starting materials of the subcomponents, mixed and pulverized. An average grain diameter of the pulverized powder is not particularly limited, but preferably 1 to 10 μm or so. The powder is added with a suitable binder, such as polyvinyl alcohol, and granulated by a spray drier, etc. to obtain a preform in a predetermined shape.

The shape of the preform is not particularly limited, but a toroidal shape may be mentioned as an example.

Next, the preform is fired under a condition by which the value α in the formula (1) in the ferrite sintered body after firing satisfies α≧0.93. As the firing condition, those described below are preferable.

The firing step preferably includes a temperature raising step, a high temperature holding step and a temperature lowering step.

In the temperature raising step, the oxygen partial pressure in the firing atmosphere is preferably 3.0% or lower.

In the high temperature holding step, the holding temperature is 1250 to 1400° C., more preferably 1260 to 1370° C. Also, when the oxygen partial pressure is $PO_2$ (%) and a holding temperature is T(K) in the high temperature holding step, the firing is performed under a $PO_2$ satisfying the formula (4) below.

$$\text{Log}(PO_2)=a-13000/T \quad \text{formula (4)}$$

Note that "a" in the formula (4) satisfies 6.95≦a≦8.85, more preferably 7.96≦a≦8.78. When "a" is less than 6.95, there arises a disadvantage that the core loss increases, while when "a" exceeds 8.85, there arises a disadvantage that the deterioration rate of the core loss in a high temperature storage test increases.

For example, the oxygen partial pressure is preferably 0.05% to 3.80% when a high temperature holding temperature is at 1300° C. The oxygen partial pressure is preferably set a little lower than that in the related art. Note that when the oxygen partial pressure is lower than 0.05%, a core loss at an initial stage before a high temperature storage test tends to deteriorate. It is preferable that the higher the holding temperature at firing, the higher the oxygen partial pressure is set. Also, there is a tendency that the lower the oxygen partial pressure, the larger the value a in the formula (1) becomes and the less deterioration of the core loss after the high temperature storage test becomes.

Also, in the temperature lowering step, it is preferable to switch to a nitrogen atmosphere at 900° C. to 1200° C. The cooling rate after switching to the nitrogen atmosphere is preferably twice to ten times as fast as that before the switching.

By selecting production conditions as above, the Mn—Zn ferrite according to the present invention can be produced easily.

Note that the present invention is not limited to the above embodiments and may be modified in various ways within the scope of the present invention.

EXAMPLES

Below, the present invention will be explained based on further detailed examples, but the present invention is not limited by the examples.

Examples 1 to 14

Starting materials of a main component and subcomponents were prepared. As starting materials of the main component, $Fe_2O_3$, $Mn_3O_4$ and ZnO were used. Also, as starting materials of the subcomponents, $Co_3O_4$, $SiO_2$ and CaO were used. These starting materials were weighed so that composition ranges after firing become the ranges below.

Namely, $Fe_2O_3$: 51.5 to 57.0 mol % and ZnO: 0 to 15 mol % (note that 0 is not included) were included, and the rest is substantially MnO, wherein $Co_3O_4$: 0 to 5000 ppm (note that 0 is not included), $SiO_2$: 50 to 220 ppm and CaO: 120 to 1400 ppm were included.

First, the starting materials of the main component were weighed so as to be in the above composition ranges, wet mixed and dried, then subjected to calcining at 900° C. for two hours in the air. Thus obtained powder after the calcining was added with weighed starting materials of the subcomponents, mixed and pulverized. An average grain diameter of the pulverized powder was 2 μm or so. The powder was added with polyvinyl alcohol as a binder and granulated by a spray drier, etc. to obtain a preform in a toroidal shape.

Next, the preform was fired in the firing condition ranges described below and a number of samples of ferrite sintered bodies having a variety of a values were obtained as shown in Table 1. The firing step includes temperature raising step, a high temperature holding step and a temperature lowering step. In the temperature raising step, the oxygen partial pressure in the firing atmosphere was 3.0% or lower. In the high temperature holding step, the holding temperature was 1250° C. to 1400° C. and, for example, the oxygen partial pressure was 0.05% to 3.80% at 1300° C. Also, in the temperature lowering step, the atmosphere was changed to a nitrogen atmosphere at 900° C. to 1200° C. The cooling rate after switching to the nitrogen atmosphere was set to be twice to ten times as fast as that before the switching.

As shown in Table 1, it was confirmed that the value a in the formula (1) in the ferrite sintered body after firing was $\alpha a \geq 0.93$.

Note that the value a in the formula (1) was calculated by composition analysis and determinate quantities of an amount of ($Fe^{2+}-Co^{3+}$) and an amount of $Mn^{3+}$. Namely, in the composition analysis, the ferrite sintered body was pulverized to powder, then amounts of $Fe_2O_3$, MnO, ZnO and CoO were measured by using a fluorescent X-ray analyzer (for example, Simultic 3530 made by Rigaku Corporation). An amount of ($Fe^{2+}-Co^{3+}$) and an amount of $Mn^{3+}$ (wt %) are quantitatively determined by pulverizing the ferrite sintered body to powder, dissolving it in acid, and performing potential difference titration by using a $K_2Cr_2O_7$ solution. As to an amount of ($Fe^{2+}-Co^{3+}$), since $Fe^{2+}$ reacts with $Co^{3+}$, it is difficult to quantitatively determine respective accurate amounts of $Fe^{2+}$ $Fe^{3+}$, $Co^{2+}$ and $Co^{3+}$ separately in the case of the Mn—Zn ferrite wherein Co is dissolved, so that it was quantitatively determined as an amount of ($Fe^{2+}-Co^{3+}$). Note that in the same ferrite sintered body, formulas Fe=$Fe^{2+}$+$Fe^{3+}$ and Co=$Co^{2+}$+$Co^{3+}$ stand.

Also, a core loss (Pcv) was measured on these samples of the Mn—Zn ferrite sintered body. The Pcv was measured by using a BH analyzer by applying a sinusoidal alternating magnetic field of 100 kHz and 200 mT in a range of 25° C. and 120° C. (25, 75 and 120° C.) (Pcv1). After measuring the Pcv, the samples were furthermore stored in the atmosphere of 175° C. or 200° C. for 96 hours and a Pcv value after the storage were measured in a range of 25° C. to 120° C. (25, 75 and 120° C.) in the same way (Pcv0, Pcv2 and Pcv3). The deterioration rate of Pcv after the storage was calculated from these values for respective temperatures.

The deterioration rate (%) of the Pcv can be calculated from the formula; Pcv Deterioration Rate (%)=((core loss Pcv1 before high temperature storage test core loss Pcv0, Pcv2 or Pcv3 after high temperature storage test)/core loss Pcv1 before high temperature storage test)×100.

Table 1 shown below shows a composition (mol %) of the main component, a content (ppm) of the subcomponent, a value a in the formula (1), a core loss (Pcv) before a high temperature storage test, a core loss (Pcv) after a high temperature storage test, and the deterioration rate (%) of the core loss. A unit of the Pcv is $kW/m^3$.

TABLE 1

| Sample No. | Main Component (mol %) Fe$_2$O$_3$ | MnO | ZnO | Subcomponent (ppm) Co$_3$O$_4$ | SiO$_2$ | CaO | Pcv (Before Test) (kW/m$^3$) 25° C. | 75° C. | 120° C. | Pcv (After Test) (kW/m$^3$) 175° C./96 hours 25° C. | 75° C. | 120° C. | Pcv Deterioration Rate (%) 175° C./96 hours 25° C. | 75° C. | 120° C. | Pcv Deterioration Rate (%) 200° C./96 hour 25° C. | 75° C. | 120° C. | Value α in Formula (1) |
|---|---|---|---|---|---|---|---|---|---|---|---|---|---|---|---|---|---|---|---|
| Example 1 | 53.8 | 35.9 | 10.3 | 3000 | 100 | 500 | 316 | 322 | 483 | 316 | 327 | 493 | 0.0 | 1.6 | 2.1 | 0.0 | 4.0 | 5.7 | 1.02 |
| Example 2 | 54.0 | 37.6 | 8.4 | 4000 | 100 | 500 | 338 | 270 | 428 | 338 | 275 | 439 | 0.0 | 1.9 | 2.6 | 0.3 | 7.8 | 9.8 | 1.01 |
| Example 3 | 53.8 | 35.9 | 10.3 | 3000 | 100 | 500 | 307 | 292 | 450 | 307 | 298 | 464 | 0.0 | 2.1 | 3.1 | 0.7 | 10.9 | 12.5 | 0.98 |
| Example 4 | 54.0 | 37.6 | 8.4 | 4000 | 100 | 500 | 362 | 318 | 403 | 362 | 324 | 416 | 0.0 | 1.9 | 3.2 | 0.6 | 12.8 | 15.4 | 0.95 |
| Example 5 | 53.8 | 35.9 | 10.3 | 3000 | 100 | 500 | 323 | 275 | 395 | 323 | 282 | 410 | 0.0 | 2.5 | 3.8 | 0.9 | 21.0 | 22.4 | 0.94 |
| Example 6 | 51.9 | 36.0 | 12.1 | 3000 | 100 | 500 | 494 | 432 | 394 | 494 | 439 | 407 | 0.0 | 1.6 | 3.3 | 0.8 | 13.6 | 15.9 | 0.99 |
| Example 7 | 56.2 | 42.9 | 0.9 | 3000 | 100 | 500 | 392 | 434 | 479 | 392 | 445 | 496 | 0.0 | 2.5 | 3.3 | 1.0 | 20.4 | 21.8 | 0.99 |
| Example 8 | 53.4 | 32.3 | 14.3 | 3000 | 100 | 500 | 338 | 355 | 481 | 338 | 362 | 497 | 0.0 | 2.0 | 3.5 | 0.6 | 10.2 | 14.6 | 0.95 |
| Example 9 | 54.1 | 36.6 | 9.3 | 1000 | 100 | 500 | 497 | 312 | 332 | 497 | 318 | 343 | 0.0 | 1.9 | 3.3 | 0.6 | 11.5 | 15.4 | 1.01 |
| Example 10 | 54.0 | 37.4 | 8.6 | 4500 | 100 | 500 | 466 | 354 | 478 | 466 | 362 | 498 | 0.0 | 2.3 | 4.2 | 1.1 | 25.9 | 28.8 | 0.98 |
| Example 11 | 53.8 | 35.9 | 10.3 | 3000 | 60 | 500 | 326 | 278 | 397 | 326 | 285 | 412 | 0.0 | 2.5 | 3.8 | 0.9 | 22.0 | 25.6 | 0.93 |
| Example 12 | 53.8 | 35.9 | 10.3 | 3000 | 210 | 500 | 325 | 277 | 397 | 325 | 284 | 411 | 0.0 | 2.5 | 3.5 | 0.9 | 20.9 | 22.7 | 0.94 |
| Example 13 | 53.8 | 35.9 | 10.3 | 3000 | 100 | 140 | 325 | 276 | 397 | 325 | 284 | 411 | 0.0 | 2.9 | 3.5 | 0.9 | 22.1 | 25.0 | 0.95 |
| Example 14 | 53.8 | 35.9 | 10.3 | 3000 | 100 | 1370 | 327 | 279 | 399 | 327 | 286 | 414 | 0.0 | 2.5 | 3.8 | 0.9 | 23.3 | 26.2 | 0.95 |
| Comparative Example 1 | 54.0 | 37.6 | 8.4 | 4000 | 100 | 500 | 315 | 286 | 369 | 315 | 295 | 388 | 0.0 | 3.1 | 5.1 | 1.3 | 27.6 | 38.3 | 0.94 |
| Comparative Example 2 | 53.8 | 35.9 | 10.3 | 3000 | 100 | 500 | 338 | 281 | 398 | 339 | 292 | 420 | 0.3 | 3.9 | 5.5 | 1.5 | 32.7 | 44.5 | 0.92 |
| Comparative Example 3 | 54.0 | 37.6 | 8.4 | 4000 | 100 | 500 | 299 | 310 | 382 | 300 | 321 | 405 | 0.3 | 3.5 | 6.0 | 2.0 | 35.4 | 48.9 | 0.90 |
| Comparative Example 4 | 53.8 | 35.9 | 10.3 | 3000 | 100 | 500 | 357 | 303 | 411 | 358 | 315 | 437 | 0.3 | 4.0 | 6.3 | 2.0 | 40.7 | 52.6 | 0.90 |
| Comparative Example 5 | 51.4 | 32.8 | 15.8 | 3000 | 100 | 500 | 787 | 655 | 494 | 787 | 670 | 514 | 0.0 | 2.3 | 4.0 | 1.0 | 20.2 | 23.5 | 0.93 |
| Comparative Example 6 | 57.1 | 42.9 | 0.0 | 2000 | 100 | 500 | 659 | 775 | 944 | 659 | 792 | 985 | 0.0 | 2.2 | 4.3 | 0.9 | 22.7 | 27.0 | 0.91 |
| Comparative Example 7 | 53.6 | 38.3 | 8.1 | 5500 | 100 | 500 | 431 | 510 | 608 | 432 | 527 | 641 | 0.2 | 3.3 | 5.4 | 1.4 | 34.4 | 45.8 | 0.90 |
| Comparative Example 8 | 54.1 | 36.6 | 9.3 | 0 | 100 | 500 | 658 | 348 | 356 | 658 | 355 | 368 | 0.0 | 2.0 | 3.4 | 0.6 | 18.3 | 23.2 | 0.94 |
| Example 15 | 53.8 | 35.9 | 10.3 | 3000 | 40 | 500 | 335 | 288 | 412 | 335 | 296 | 427 | 0.0 | 2.8 | 3.6 | 0.9 | 20.7 | 24.4 | 0.94 |
| Example 16 | 53.8 | 35.9 | 10.3 | 3000 | 230 | 500 | 338 | 289 | 414 | 338 | 297 | 430 | 0.0 | 2.8 | 3.9 | 1.2 | 23.8 | 28.1 | 0.93 |
| Example 17 | 53.8 | 35.9 | 10.3 | 3000 | 100 | 110 | 337 | 288 | 410 | 337 | 295 | 426 | 0.0 | 2.4 | 3.9 | 0.9 | 19.6 | 23.9 | 0.94 |
| Example 18 | 53.8 | 35.9 | 10.3 | 3000 | 100 | 1430 | 340 | 293 | 416 | 340 | 301 | 431 | 0.0 | 2.7 | 3.6 | 0.9 | 18.8 | 23.0 | 0.94 |

Comparative Examples 1 to 4

A plurality of samples of ferrite sintered bodies were prepared in the same way as in the above examples 1 to 14 wherein the firing condition was changed, the composition ranges were the same as those in the example 1 or 2 but the value a in the formula (1) became out of the range of the examples 1 to 14. In the comparative examples 1 to 4, particularly the oxygen partial pressure in the high temperature holding process at firing was, for example, higher than 3.80% at 1300° C. when compared with examples 1 to 14.

The same measurement and test as in the examples 1 to 14 were performed on the plurality of samples of the ferrite sintered bodies according to these comparative examples. A composition (mol %) of the main component, a content (ppm) of the subcomponent, a value α in the formula (1), a core loss (Pcv) before a high temperature storage test, a core loss (Pcv) after a high temperature storage test, and the deterioration rate (%) of the core loss according to the comparative examples are shown in Table 1.

Comparative Examples 5 and 6

A plurality of samples of ferrite sintered bodies were prepared in the same way as in the examples 1 to 14 except for becoming out of the ranges in $Fe_2O_3$: 51.5 to 57.0 mol % and ZnO: 0 to 15 mol %.

The same measurement and test as in the examples 1 to 14 were performed on the samples of the ferrite sintered bodies according to these comparative examples. A composition (mol %) of the main component, a content (ppm) of the subcomponent, a value a in the formula (1), a core loss (Pcv) before a high temperature storage test, a core loss (Pcv) after a high temperature storage test, and the deterioration rate (%) of the core loss according to the comparative examples are shown in Table 1.

Comparative Examples 7 and 8

A plurality of samples of ferrite sintered bodies were prepared in the same way as in the examples 1 to 14 except for becoming out of the range in $Co_3O_4$: 0 to 5000 ppm (note that 0 is not included).

The same measurement and test as in the examples 1 to 14 were performed on the samples of the ferrite sintered bodies according to these comparative examples. A composition (mol %) of the main component, a content (ppm) of the subcomponent, a value α in the formula (1), a core loss (Pcv) before a high temperature storage test, a core loss (Pcv) after a high temperature storage test, and the deterioration rate (%) of the core loss according to the comparative examples are shown in Table 1.

Examples 15 to 18

A plurality of samples of ferrite sintered bodies were prepared in the same way as in the examples 1 to 14 except for becoming out of the ranges of $SiO_2$: 50 to 220 ppm and CaO: 120 to 1400 ppm.

The same measurement and test as in the examples 1 to 14 were performed on the samples of the ferrite sintered bodies according to these comparative examples. A composition (mol %) of the main component, a content (ppm) of the subcomponent, a value a in the formula (1), a core loss (Pcv) before a high temperature storage test, a core loss (Pcv) after a high temperature storage test, and the deterioration rate (%) of the core loss according to the comparative examples are shown in Table 1.

Evaluation 1

As shown in Table 1, (A) By comparing the examples 1 to 14 with the comparative examples 1 to 4, the facts below were confirmed. Namely, in a Mn—Zn ferrite having a basic components including $Fe_2O_3$: 51.5 to 57.0 mol % and ZnO: 0 to 15 mol % (note that 0 is not included) wherein the rest was substantially MnO, and 0 to 5000 ppm (note that 0 was not included) of a Co oxide in a $Co_3O_4$ conversion was also included, when the value a in the formula (1) in the above ferrite was made to satisfy $\alpha \geq 0.93$, it was confirmed that deterioration of a core loss (the Pcv deterioration rate at 75° C.) after the high temperature storage test (96 hours under 175° C.) could be suppressed to, for example, 3% or less or so, and the Pcv deterioration rate at 120° C. could be suppressed to, for example, 5% or less (preferably, 4.5% or less) or so. On the other hand, in the comparative examples 1 to 4, $\alpha \geq 0.93$ was not satisfied, the Pcv deterioration rate at 75° C. exceeded 3% and the Pcv deterioration rate at 120° C. also exceeded 5%.

It was also confirmed that the deterioration of a core loss (Pcv deterioration rate at 75° C.) after the high temperature storage test (96 hours under 200° C.) could be suppressed to, for example, 27% or less or so, furthermore, the Pcv deterioration rate at 120° C. could be suppressed to, for example, 30% or less or so. On the other hand, in the comparative examples 1 to 4, $\alpha \geq 0.93$ was not satisfied, the Pcv deterioration rate at 75° C. exceeded 27% and the Pcv deterioration rate at 120° C. also exceeded 30%.

(B) By comparing the examples 1 to 14 with the comparative examples 5 to 8, the facts below were confirmed. Namely, it was confirmed that by mixing 0 to 5000 ppm (note that 0 was not included) of a Co oxide in a $Co_3O_4$ conversion in the basic components including $Fe_2O_3$: 51.5 to 57.0 mol % and ZnO: 0 to 15 mol % (note that 0 is not included) wherein the rest was substantially MnO, the core loss (Pcv) before the high temperature storage test could be suppressed as low as, for example, 500 kW/m³ or less or so in a wide temperature range (25 to 120° C.). Note that in the comparative examples 5 to 8, although the Pcv deterioration rate could be made close to those in the examples, the core loss at an initial stage before the high temperature storage test becomes as large as 500 kW/m³ or more at a predetermined temperature, and a reduced core loss is hard to be obtained in a wide temperature range of 25 to 120° C.

(C) By comparing the examples 1 to 14 with the examples 15 to 18, the facts below were confirmed. Namely, it was confirmed that when a content of $SiO_2$ becomes smaller than 50 ppm or when a content of CaO becomes smaller than 120 ppm, the core loss at an initial stage before the high temperature storage test and the core loss after the high temperature storage test tend to increase compared with those having the same composition except for the content of $SiO_2$ or CaO.

(D) By comparing the examples 1 to 14 one to another, the facts below were confirmed. Namely, by setting the value a in the formula (1) to be $\alpha \geq 0.94$, the deterioration rate (120° C.) of a core loss after the high temperature storage test (96 hours under 175° C.) could be made within 4.0% which is furthermore small. Also, the deterioration rate (75° C.) of a core loss after the high temperature storage test under severer conditions (96 hours under 200° C.) could be furthermore suppressed as small as within 25%, and the deterioration rate (120° C.) of a core loss could be furthermore suppressed as small as within 27%.

Furthermore, by setting the value α in the formula (1) in the ferrite to satisfy $\alpha > 0.95$, the deterioration rate (120° C.)

of a core loss after the high temperature storage test (96 hours under 175° C.) could be made within 3.5% which is furthermore small. Also, the deterioration rate (75° C.) of a core loss after the high temperature storage test under severer conditions (96 hours under 200° C.) could be furthermore suppressed as small as within 23%, and the deterioration rate (120° C.) of a core loss could be furthermore suppressed as small as within 25%.

Examples 19 to 33

A plurality of samples of ferrite sintered bodies were prepared in the same way as in the examples 1 to 14 except for mixing any of $Nb_2O_5$, $ZrO_2$, $Ta_2O_5$, $V_2O_5$ and $HfO_2$ in the composition range below in the composition of the above example 5 ($Fe_2O_3$: 53.8 mol %, MnO: 35.9 mol %, ZnO: 10.3 mol %, $Co_3O_4$: 3000 ppm, $SiO_2$: 100 ppm and CaO: 500 ppm) as a base.

Namely, at least one kind of $Nb_2O_5$: 0 to 500 ppm (note that 0 is not included), $ZrO_2$: 0 to 500 ppm (note that 0 is not included), $Ta_2O_5$: 0 to 1000 ppm (note that 0 is not included), $V_2O_5$: 0 to 500 ppm and $HfO_2$: 0 to 500 ppm (note that 0 is not included) was included in the composition of the example 5.

The same measurement and test as in the examples 1 to 14 were performed on the samples of the ferrite sintered bodies according to these examples. Contents (ppm) of $Nb_2O_5$, $ZrO_2$, $Ta_2O_5$, $V_2O_5$ and $HfO_2$, a value a in the formula (1), a core loss (Pcv) before a high temperature storage test, a core loss (Pcv) after a high temperature storage test, and the deterioration rate (%) of the core loss according to these examples are shown in Table 2.

TABLE 2

| Sample No. | Subcomponent (ppm) | | | | | Pcv (Before Test) (kW/m³) | | | Pcv (After Test) (kW/m³) | | | 175° C./96 hours | | | 200° C./96 hour | | | Value α in Formula (1) |
|---|---|---|---|---|---|---|---|---|---|---|---|---|---|---|---|---|---|---|
| | Nb₂O₅ | ZrO₂ | Ta₂O₅ | V₂O₅ | HfO₂ | 25° C. | 75° C. | 120° C. | 25° C. | 75° C. | 120° C. | 25° C. | Pcv Deterioration Rate (%) 75° C. | 120° C. | 25° C. | Pcv Deterioration Rate (%) 75° C. | 120° C. | |
| Example 19 | 50 | 0 | 0 | 0 | 0 | 318 | 269 | 386 | 318 | 276 | 399 | 0.0 | 2.6 | 3.4 | 0.9 | 19.8 | 22.9 | 0.95 |
| Example 20 | 200 | 0 | 0 | 0 | 0 | 312 | 264 | 380 | 312 | 271 | 393 | 0.0 | 2.7 | 3.4 | 1.0 | 20.1 | 22.1 | 0.96 |
| Example 21 | 450 | 0 | 0 | 0 | 0 | 317 | 268 | 385 | 317 | 275 | 399 | 0.0 | 2.6 | 3.6 | 0.6 | 19.1 | 22.3 | 0.94 |
| Example 22 | 0 | 50 | 0 | 0 | 0 | 317 | 270 | 386 | 317 | 276 | 399 | 0.0 | 2.2 | 3.4 | 0.9 | 18.7 | 21.6 | 0.96 |
| Example 23 | 0 | 200 | 0 | 0 | 0 | 312 | 265 | 381 | 312 | 271 | 394 | 0.0 | 2.3 | 3.4 | 1.0 | 18.8 | 21.0 | 0.96 |
| Example 24 | 0 | 450 | 0 | 0 | 0 | 316 | 269 | 384 | 316 | 276 | 397 | 0.0 | 2.6 | 3.4 | 0.6 | 20.3 | 22.8 | 0.95 |
| Example 25 | 0 | 0 | 50 | 0 | 0 | 319 | 268 | 385 | 319 | 275 | 398 | 0.0 | 2.6 | 3.4 | 0.9 | 18.4 | 21.9 | 0.96 |
| Example 26 | 0 | 0 | 400 | 0 | 0 | 313 | 263 | 379 | 313 | 270 | 393 | 0.0 | 2.7 | 3.7 | 0.6 | 21.2 | 23.0 | 0.94 |
| Example 27 | 0 | 0 | 900 | 0 | 0 | 315 | 267 | 382 | 315 | 273 | 395 | 0.0 | 2.2 | 3.4 | 0.3 | 20.5 | 23.2 | 0.95 |
| Example 28 | 0 | 0 | 0 | 50 | 0 | 318 | 268 | 387 | 318 | 275 | 400 | 0.0 | 2.6 | 3.4 | 0.6 | 20.8 | 23.4 | 0.95 |
| Example 29 | 0 | 0 | 0 | 200 | 0 | 315 | 265 | 385 | 315 | 272 | 398 | 0.0 | 2.6 | 3.4 | 1.0 | 19.2 | 22.6 | 0.95 |
| Example 30 | 0 | 0 | 0 | 450 | 0 | 317 | 266 | 386 | 317 | 272 | 399 | 0.0 | 2.3 | 3.4 | 0.9 | 21.0 | 23.7 | 0.94 |
| Example 31 | 0 | 0 | 0 | 0 | 50 | 316 | 267 | 386 | 316 | 274 | 399 | 0.0 | 2.6 | 3.4 | 0.9 | 20.4 | 22.8 | 0.95 |
| Example 32 | 0 | 0 | 0 | 0 | 200 | 312 | 264 | 382 | 312 | 270 | 395 | 0.0 | 2.3 | 3.4 | 0.6 | 18.7 | 22.3 | 0.95 |
| Example 33 | 0 | 0 | 0 | 0 | 450 | 314 | 266 | 384 | 314 | 272 | 397 | 0.0 | 2.3 | 3.4 | 1.0 | 18.9 | 21.7 | 0.95 |
| Example 5 | 0 | 0 | 0 | 0 | 0 | 323 | 275 | 395 | 323 | 282 | 410 | 0.0 | 2.5 | 3.8 | 0.9 | 21.0 | 22.4 | 0.94 |
| Example 34 | 600 | 0 | 0 | 0 | 0 | 331 | 282 | 408 | 331 | 289 | 424 | 0.0 | 2.5 | 3.9 | 0.6 | 20.6 | 23.9 | 0.94 |
| Example 35 | 0 | 600 | 0 | 0 | 0 | 334 | 286 | 411 | 334 | 294 | 426 | 0.0 | 2.8 | 3.6 | 0.9 | 22.0 | 24.7 | 0.95 |
| Example 36 | 0 | 0 | 1100 | 0 | 0 | 337 | 288 | 416 | 337 | 295 | 431 | 0.0 | 2.4 | 3.6 | 0.9 | 20.3 | 22.9 | 0.94 |
| Example 37 | 0 | 0 | 0 | 600 | 0 | 335 | 282 | 410 | 335 | 289 | 425 | 0.0 | 2.5 | 3.7 | 1.2 | 20.9 | 24.5 | 0.94 |
| Example 38 | 0 | 0 | 0 | 0 | 600 | 337 | 286 | 414 | 337 | 293 | 429 | 0.0 | 2.4 | 3.6 | 0.9 | 21.5 | 24.3 | 0.94 |

Examples 34 to 38

A plurality of samples of ferrite sintered bodies were prepared in the same way as in the examples 1 to 14 except for mixing any of $Nb_2O_5$, $ZrO_2$, $Ta_2O_5$, $V_2O_5$ and $HfO_2$ in the composition range below in the composition of the above example 5 ($Fe_2O_3$: 53.8 mol %, MnO: 35.9 mol %, ZnO: 10.3 mol %, $Co_3O_4$: 3000 ppm, $SiO_2$: 100 ppm and CaO: 500 ppm) as a base.

Namely, at least one kind among $Nb_2O_5$: 600 ppm, $ZrO_2$: 600 ppm, $Ta_2O_5$: 1100 ppm, $V_2O_5$: 600 ppm and $HfO_2$: 600 ppm was included in the composition of the example 5.

The same measurement and test as in the examples 1 to 14 were performed on the samples of the ferrite sintered bodies according to these examples. Contents (ppm) of $Nb_2O_5$, $ZrO_2$, $Ta_2O_5$, $V_2O_5$ and $HfO_2$, a value a in the formula (1), a core loss (Pcv) before a high temperature storage test, a core loss (Pcv) after a high temperature storage test, and the deterioration rate (%) of the core loss according to these examples are shown in Table 2.

Evaluation 2

By comparing the example 5 with the examples 19 to 33, it was confirmed that, by mixing in any of $Nb_2O_5$, $ZrO_2$, $Ta_2O_5$, $V_2O_5$ and $HfO_2$, the Pcv deterioration rate can be made small, a reduced core loss is easily obtained in a desired wide temperature range of 25 to 120° C., and deterioration of a core loss characteristics after the high temperature storage test can be made furthermore small compared with those having the same composition except for not containing the subcomponents.

Also, by comparing the examples 19 to 33 with the examples 34 to 38, it was confirmed that preferable ranges of $Nb_2O_5$, $ZrO_2$, $Ta_2O_5$, $V_2O_5$ and $HfO_2$ were as below.

Namely, it was confirmed that $Nb_2O_5$: 0 to 500 ppm (note that 0 is not included), $ZrO_2$: 0 to 500 ppm (note that 0 is not included), $Ta_2O_5$: 0 to 1000 ppm (note that 0 is not included), $V_2O_5$: 0 to 500 ppm and $HfO_2$: 0 to 500 ppm (note that 0 is not included) were preferable.

Examples 39 to 44

A plurality of samples of ferrite sintered bodies were prepared in the same way as in the examples 1 to 14 except for mixing both of P and B in the composition range below in the composition of the above example 20 ($Fe_2O_3$: 53.8 mol %, MnO: 35.9 mol %, ZnO: 10.3 mol %, $Co_3O_4$: 3000 ppm, $SiO_2$: 100 ppm, CaO: 500 ppm and $Nb_2O_5$: 200 ppm) as a base.

Namely, phosphorus (P) and boron (B) in a range of $P \leq 35$ ppm or $B \leq 35$ ppm were included in the composition of the example 20.

The same measurement and test as in the examples 1 to 14 were performed on the samples of the ferrite sintered bodies according to these examples. Contents (ppm) of P and B, a value a in the formula (1), a core loss (Pcv) before a high temperature storage test, a core loss (Pcv) after a high temperature storage test, and the deterioration rate (%) of the core loss according to these examples are shown in Table 3.

TABLE 3

| Sample No. | Subcomponent (ppm) | | Pcv (Before Test) (kW/m³) | | | 175° C./96 hours | | | | | |
|---|---|---|---|---|---|---|---|---|---|---|---|
| | | | | | | Pcv (After Test) (kW/m³) | | | Pcv Deterioration Rate (%) | | |
| | P | B | 25° C. | 75° C. | 120° C. | 25° C. | 75° C. | 120° C. | 25° C. | 75° C. | 120° C. |
| Example 20 | 7 | 8 | 312 | 264 | 380 | 312 | 271 | 393 | 0.0 | 2.7 | 3.4 |
| Example 39 | 15 | 8 | 340 | 292 | 408 | 340 | 300 | 421 | 0.0 | 2.7 | 3.2 |
| Example 40 | 25 | 8 | 361 | 316 | 431 | 361 | 324 | 445 | 0.0 | 2.5 | 3.2 |
| Example 41 | 35 | 8 | 386 | 341 | 457 | 386 | 350 | 472 | 0.0 | 2.6 | 3.3 |
| Example 42 | 7 | 15 | 336 | 287 | 404 | 336 | 294 | 417 | 0.0 | 2.4 | 3.2 |
| Example 43 | 7 | 25 | 354 | 307 | 424 | 354 | 315 | 439 | 0.0 | 2.6 | 3.5 |
| Example 44 | 7 | 35 | 380 | 334 | 450 | 380 | 343 | 466 | 0.0 | 2.7 | 3.6 |
| Example 45 | 45 | 8 | 420 | 377 | 491 | 420 | 387 | 508 | 0.0 | 2.7 | 3.5 |
| Example 46 | 7 | 45 | 410 | 367 | 484 | 410 | 376 | 501 | 0.0 | 2.5 | 3.5 |

| Sample No. | 200° C./96 hours Pcv Deterioration Rate (%) | | | Value α in Formula (1) |
|---|---|---|---|---|
| | 25° C. | 75° C. | 120° C. | |
| Example 20 | 1.0 | 20.1 | 22.1 | 0.95 |
| Example 39 | 0.9 | 21.1 | 23.9 | 0.95 |
| Example 40 | 0.8 | 20.3 | 23.5 | 0.95 |
| Example 41 | 0.5 | 21.8 | 24.0 | 0.94 |
| Example 42 | 0.6 | 19.7 | 22.5 | 0.96 |
| Example 43 | 0.6 | 20.6 | 21.9 | 0.94 |
| Example 44 | 0.5 | 19.8 | 21.0 | 0.94 |
| Example 45 | 0.7 | 18.8 | 22.2 | 0.94 |
| Example 46 | 0.7 | 20.2 | 21.5 | 0.94 |

Examples 45 and 46

A plurality of samples of ferrite sintered bodies were prepared in the same way as in the examples 1 to 14 except for mixing both of P and B in the composition range below in the composition of the above example 20 ($Fe_2O_3$: 53.8 mol %, MnO: 35.9 mol %, ZnO: 10.3 mol %, $Co_3O_4$: 3000 ppm, $SiO_2$: 100 ppm, CaO: 500 ppm and $Nb_2O_5$: 200 ppm) as a base.

Namely, phosphorus (P) and boron (B) in a range of P=45 or 7 ppm and B=8 or 45 ppm were included in the composition of the example 20.

The same measurement and test as in the examples 1 to 14 were performed on the samples of the ferrite sintered bodies according to these examples. Contents (ppm) of P and B, a value a in the formula (1), a core loss (Pcv) before a high temperature storage test, a core loss (Pcv) after a high temperature storage test, and the deterioration rate (%) of the core loss according to these examples are shown in Table 3.

Evaluation 3

By comparing the examples 39 to 44 with the examples 45 and 46, it was confirmed that phosphorus (P) and boron (B) could be contained and contents in the ferrite were preferably P≦35 ppm or B≦35 ppm. It was confirmed that when a content of P becomes larger than 35 ppm, or when a content of B becomes larger than 35 ppm, the Pcv value before the test becomes large and an effect of reducing the Pcv in a wide temperature range of 25 to 120° C. is deteriorated.

What is claimed is:

1. An Mn—Zn ferrite wherein from 0 to 5000 (note that 0 is not include of a Co oxide in a $Co_3O_4$ conversion is contained in a basic component constituted by $Fe_2O_3$: 51.5 to 57.0 mol % and ZnO: 0 to 15 mol % (note that 0 is not included) wherein the rest is substantially constituted by MnO; wherein a value α in a formula (1) below in said ferrite satisfies α≧093, $$\alpha=((Fe^{2+}-Mn^{3+}-Co^{3+})\times(4.29\times A1.91\times B+2.19\times C+2.01\times D))/((A-B-C-D)\times100) \quad \text{formula (1)}$$

wherein the formula (1), ($Fe^{2+}-Mn^{3+}-Co^{3+}$):[wt %], A: $Fe_2O_3$ [mol %], B: MnO [mol %], C: ZnO [mol %] and D: CoO [mol %].

2. An Mn—Zn ferrite as set forth in claim 1, wherein when a sinusoidal alternating magnetic field of 100 kHz and 200 mT is applied to said ferrite, values of a core loss measured respectively at 75° C. and 120° C. are Pcv1, and values of a core loss measured under the same condition as that in the measurement of Pcv1 after stored at a high temperature (96 hours in an atmosphere of 175° C.) are Pcv2, a core loss deterioration rate shown in a formula (2) is 3% or less at 75° C., or 5% or less at 120° C., $$\text{Core Loss Deterioration Rate }(\%)=((Pcv1-Pcv2)/Pcv1)\times100 \quad \text{formula (2).}$$

3. An Mn—Zn ferrite as set forth in claim 1, wherein when a sinusoidal alternating magnetic field of 100 kHz and 200 mT is applied to said ferrite, values of a core loss measured respectively at 75° C. and 120° C. are Pcv1, and values of a core loss measured under the same condition as that in the measurement of Pcv1 after stored at a high temperature (96 hours in an atmosphere of 200° C.) are Pcv3, a core loss deterioration rate shown in a formula (3) is 27% or less at 75° C., or 30% or less at 120° C., $$\text{Core Loss Deterioration Rate }(\%)=((Pcv1-Pcv3)/Pcv1)\times100 \quad \text{formula (3).}$$

4. An Mn—Zn ferrite as set forth in claim 1, containing $SiO_2$: 50 to 200 ppm and CaO: 120 to 1400 ppm as other subcomponents.

5. An Mn—Zn ferrite as set forth in claim 4, containing at least one of $Nb_2O_5$: 0 to 500 ppm (note that 0 is not included), $ZrO_2$: 0 to 500 ppm (note that 0 is not included), $Ta_2O_5$: 0 to 1000 ppm (note that 0 is not included), $V_2O_5$: 0 to 500 ppm (note that 0 is not included), and $HfO_2$: 0 to 500 ppm (note that 0 is not included) as further other subcomponents.

6. An Mn—Zn ferrite as set forth in claim 1, wherein a content of P and B in said ferrite is P≦35 ppm or B≦35 ppm.

7. A transformer magnetic core, comprising the Mn—Zn ferrite as set forth in claim 1.

8. A transformer, wherein a coil is wound around the transformer magnetic core as set forth in claim 7.

9. A method of producing an Mn—Zn ferrite, wherein from 0 to 5000 pp (note that 0 is not included) of a Co oxide in a $Co_3O_4$ conversion is contained in a basic component constituted by $Fe_2O_3$: 51.5 to 57.0 mol % and ZnO: 0 to 15 mol % (note that 0 is not included) wherein the rest is substantially constituted by MnO, including:

a material preparation step for preparing materials so as to be in the above composition range;

a formation step for adding a binder to said materials and forming to be a predetermined shape to form a preform; and a firing step for firing said preform;

wherein said firing step includes a high temperature holding step; and a holding temperature in the high temperature holding step is 1250° C. to 1400° C., and when an oxygen partial pressure of a firing atmosphere is $PO_2$ (%) and the holding temperature is T(K), firing is performed under a $PO_2$ satisfying a formula (4)

$$\text{Log}(PO_2)=a-1300/T \quad \text{formula (4)}$$

wherein "a" in the formula (4) satisfies 6.95≦a≦8.85.

10. An Mn—Zn ferrite as set forth in claim 2, containing $SiO_2$: 50 to 220 ppm and CaO: 120 to 1400 ppm as other subcomponents.

11. An Mn—Zn ferrite as set forth in claim 3, containing $SiO_2$: 50 to 220 ppm and CaO: 120 to 1400 ppm as other subcomponents.

12. An Mn—Zn ferrite as set forth in claim 2, wherein a content of P and B in said ferrite is P≦35 ppm or B≦35 ppm.

13. An Mn—Zn ferrite as set forth in claim 3, wherein a content of P and B in said ferrite is P≦35 ppm or B≦35 ppm.

14. A transformer magnetic core, comprising the Mn—Zn ferrite as set forth in claim 2.

15. A transformer magnetic core, comprising the Mn—Zn ferrite as set forth in claim 3.

* * * * *